(12) United States Patent
Legeido et al.

(10) Patent No.: US 8,264,230 B2
(45) Date of Patent: Sep. 11, 2012

(54) METHOD AND DEVICE FOR CARRYING OUT MARINE ELECTRICAL EXPLORATION DURING A SHIP TRAVEL

(75) Inventors: Petr Yuryevich Legeido, Lomonosova (RU); Mark Mironovich Mandelybaum, Cheremkhovskiy (RU); Yury Aleksandrovich Davydenko, Deputatskaya (RU); Ivan Yuryevich Pesterev, Rabochaya (RU); Viktor Valerevich Vladimirov, Proletarskaya (RU)

(73) Assignee: Obshchestvo S Ogranichennoy Otvetstvennostyu "Sibirskaya Geofizicheskaya Nauchno-Proizvodstvennaya Kompaniya", Irkutsk, Ul. Klary Tsetkin (RU)

( * ) Notice: Subject to any disclaimer, the term of this patent is extended or adjusted under 35 U.S.C. 154(b) by 400 days.

(21) Appl. No.: 12/599,289

(22) PCT Filed: May 8, 2007

(86) PCT No.: PCT/RU2007/000233
§ 371 (c)(1),
(2), (4) Date: Feb. 11, 2010

(87) PCT Pub. No.: WO2008/136700
PCT Pub. Date: Nov. 13, 2008

(65) Prior Publication Data
US 2010/0148786 A1 Jun. 17, 2010

(51) Int. Cl.
*G01V 3/00* (2006.01)
(52) U.S. Cl. .......... 324/365; 324/363; 324/358; 702/6
(58) Field of Classification Search .......... 324/323–375; 702/6, 11
See application file for complete search history.

(56) References Cited

U.S. PATENT DOCUMENTS

| | | | |
|---|---|---|---|
| 4,617,518 A | 10/1986 | Srnka | |
| 7,737,699 B2 * | 6/2010 | Rykhlinski et al. | 324/365 |

FOREIGN PATENT DOCUMENTS

| | | |
|---|---|---|
| RU | 2069375 C1 | 11/1996 |
| RU | 2094829 C1 | 10/1997 |
| RU | 2236028 C | 9/2004 |
| RU | 2253881 C | 6/2005 |
| SU | 1122998 A | 11/1984 |
| SU | 1436675 A | 6/1994 |

* cited by examiner

*Primary Examiner* — Patrick Assouad
*Assistant Examiner* — Alesa Allgood
(74) *Attorney, Agent, or Firm* — Hultquist, PLLC; Steven J. Hultquist (57) ABSTRACT

In order to increase result accuracy the noise effect during vessel motion is reduced, wherefore direct current pulses are excited the parameters of which are set basing on section conductivity and deposit depth, the electric field is measured simultaneously on pairs of receiving electrodes basing on the spatial averaging of potential of double electric layer that is generated on the boundary of electrode and water during the pulses and pauses between them, and geoelectrical parameters are determined.

The device consists of an exciting field generating unit where a switchboard generates pulses on feeding electrodes, a generator consists of two parallel cable lines with emitting electrodes, a non-emitting ballast device that is a pair of alternating electric dipoles with equal moments, and a measuring unit with pairs of sectional receiving electrodes, the total length of an electrode section does not exceed 5% of the distance between the electrodes, and the connection between the electrode elements that are connected to the receiver line through a common input/output provides composition of the EMF that are generated in them.

7 Claims, 5 Drawing Sheets

METHOD AND DEVICE FOR CARRYING OUT MARINE ELECTRICAL EXPLORATION DURING A SHIP TRAVEL

CROSS-REFERENCE TO RELATED APPLICATION

This application is a U.S. national phase filed under the provisions of 35 U.S.C. §371 of International Application No. PCT/RU07/00233 filed May 8, 2007. The disclosure of such international application is hereby incorporated herein by reference in its entirety, for all purposes.

PERTINENT ART

The invention group entitled "Method of marine electrical exploration and device for marine electrical exploration during vessel motion" belongs to the field of exploratory geophysics, in particular, geological electrical exploration using the induced polarization method. It is used for probing the sea bottom in shelf area during vessel motion and designed for predicting of hydrocarbon deposits.

PRIOR ART

There is a known invention entitled "Method of marine electrical exploration", RU patent No. 2069375, which uses measurements based on registration of the ratio of the second difference of potentials to the first one. The method allows increasing of sensitivity, but by the variance of characteristic parameters of the graph, namely, ordinates of minimum, gradients of descending and ascending branches, and by interpretative transformations of measured parameters the conclusions are made on existence of anomalous zones of the polarization effect of section. However, the method does not have a sufficient resolving capability in marine conditions.

There is a known geoelectrical exploration method, RU patent No. 1436675, in which an electromagnetic field is excited by passing a periodic sequence of alternating-sign rectangular pulses through explored medium. The first and the second axial differences of potentials are measured at a given frequency. However, the method does not enable construction of a model of the geoelectrical profile of explored deposit.

There exists a method of electrical exploration by exciting a pulse electromagnetic field (RU patent No. 2094829) where in pauses between current pulses the intensity of the electromagnetic field of the induced polarization is registered by detecting of geoelectrical inhomogeneities. However, the proposed solution is only based on a special form of visualization of data measured in one span and does not apply any model approximations of explored medium.

The closest technical solution for the proposed method of marine electrical exploration during vessel motion is a method disclosed in a patent "Device for marine electrical exploration during vessel motion" (RU patent No. 2253881). The idea of the known method is that during the motion of a vessel the exploration is carried out by exciting of bipolar rectangular current pulses in medium and simultaneous measuring of the electric field on pairs of receiving electrodes of a receiver multi-channel line, then the geoelectrical sections are constructed, and a conclusion on existence of a hydrocarbon deposit is made basing on the identified anomalies of conductivity and parameters of induced polarization.

However, the proposed method does not enable a marine geoelectrical exploration with maximum accuracy during vessel motion due to noise on the receiving electrodes, which appears due to a changing in flowing medium potential of double electric layer arising on the electrode-water boundary during motion.

There are some known measurement devices for distance determining, which use sectional electrodes, e.g., according to the RU patent No. 2221217, however, it solves a different technical problem, namely, for lateral logging of boreholes (LL) where probes with different electrode length are used for better contact.

The closest technical solution to the proposed device for marine electrical exploration during vessel motion is offered in a patent "Device for marine electrical exploration during vessel motion and a method of marine electrical exploration" (RU patent No. 2253881). In the known technical solution, the device for marine electrical exploration during vessel motion consists of an exciting field generation unit, which includes a switchboard generating bipolar rectangular direct current pulses on feeding electrodes with 0.5 to 10 s duration and 5 to 1000 A current strength, with a relative duration of pulse sequence set by program, a generator plant consisting of two cable lines, where the first line is 100 m long or shorter and has at least one emitting electrode on the end or near the end, and the second line is 500 to 1000 m long and has at least one emitting electrode on the end or near the end, both lines are placed behind the vessel stern and made of cable with over 5% positive buoyancy, a non-emitting ballast device placed behind the vessel stern and being pairs of alternating electrical dipoles with equal moments, and a signal measurement unit comprising a receiver multi-electrode cable line placed behind the vessel stern and tugged on a given depth from the water surface, with length of about 2,000 m, made of stranded cable with a buoyancy close to neutral, connected to a multi-channel measurement device and equipped with receiving electrodes placed on a receiver multi-electrode cable line with about 200 m interval, which are spatially located both between the emitting electrodes of the generator plant and behind them.

However, the design of that device enables marine electrical exploration with no account taken of noise on receiving electrodes arising due to a changing in flowing medium potential of double electric layer, but the maximum accuracy of measurement of potential difference during vessel motion is not achieved by eliminating of noise on receiving electrodes, which arises in the flowing medium on the electrode-water boundary during motion.

Engineering Problem

It is required to localize a hydrocarbon deposit based on exploration of transient electric field after the medium is excited by direct current pulses.

Here, it is required to do a geoelectrical exploration of deposit by investigating transient phenomena at a field transient in a medium after the field is affected with direct current pulses. That includes analysis of the curves of field transient during transient phenomena, after processing the curves are presented in the form of a medium model including the geoelectrical section.

As it is hard to raise the signal—noise ratio at further processing of the received signal as the frequency domains of the valid signal and the noise are the same, one needs to remove or reduce the noise arising on the receiving electrodes due to the changing in the medium potential of the double electric field arising on the electrode-water boundary and changing when affected by turbulent flows arising as the tail with electrodes moves in water.

The technical result of the invention group is a higher accuracy of measurements in exploration during vessel motion due to reduction of the noise arising in a flowing medium on the electrode-water boundary in motion.

The problem is solved by exploration of the geological medium during vessel motion along the observation profile performed by exciting of periodical alternating-sign current pulses, for which purposes bipolar rectangular direct current pulses are generated, the length and relative duration of which are set by program basing on the total conductivity of the geological section and expected depth of deposit, the electric field is measured simultaneously on pairs of receiving electrodes of the receiver multi-channel line both for the direct current pulses and in the pauses between them, for a given point of the medium the parameters of layered conducting and polarizable medium of the given point of the observation profile are so selected that the value of characteristics of estimated field of the medium would be equal to the simultaneous measurements on all the pairs of the receiver multi-channel cable line obtained both for the direct current pulses and in the pauses between them, selection of parameters of the layered conducting and polarizable medium is repeated for each given point of the observation profile, and a conclusion on existence of a hydrocarbon deposit is made basing on the identified anomalies of conductivity and induced polarization parameters, and here measurement of the electric field is done basing on spatial averaging of the potential of the double electric layer arising on the electrode-water boundary during vessel motion, on pairs of receiving sectional electrodes of the receiver multi-channel line. In particular, the geoelectrical parameters of medium may be determined using an adjustment factor, after which a conclusion is made on existence of a hydrocarbon deposit by the detected anomalies, which reflect the adjusted parameters of induced polarization.

For implementation of the claimed method, a device for marine electrical exploration during vessel motion is proposed, which consists of an exciting field generation unit, which includes a switchboard generating two bipolar rectangular direct current pulses on feeding electrodes with 0.5 to 10 s duration and 5 to 1000 A current strength, with a relative duration of the pulse sequence set by program, a ship generator, unit consisting of two cable lines, where the first line is 100 m long or shorter and has at least one emitting electrode on the end or near the end, and the second line is 500 to 1000 m long and has at least one emitting electrode on the end or near the end, both lines are parallel, placed behind the vessel stern, and made of cable with 5-15% positive buoyancy, the emitting electrodes are made of conductive material allowing their slow destruction at passage of current, a non-emitting ballast device placed behind the vessel stern and being pairs of differently directed electrical dipoles with equal moments, and a signal measurement unit comprising a receiver multi-electrode cable line placed behind the vessel stern on a given depth from the water surface, with length of 1,000 to about 2,000 m, made of stranded cable with a buoyancy close to neutral, connected to a multi-channel measurement device and equipped with receiving electrodes placed on a receiver multi-electrode cable line with a 100 to about 200 m interval, which are spatially located both between the emitting electrodes of the generator plant and behind them, a resistivity meter, a multi-channel measurement device, a ship echo sounder, a Global Position System reception indicator, and a signal processor, with each of the receiving electrodes being a sectional electrode, the total length of all the section of which does not exceed 5% of the distance between the electrodes (the span between pairs of receiving sectional electrodes, which is a group of receiving electrodes or a sectional electrode with an equipotential surface), the elements of a sectional electrode are electrically connected to each other so that the EMF in them are added, and they are connected to the receiver multi-electrode cable line through a common input/output. In particular, the sectional electrodes may be made of metal wire with a low value of polarizability coefficient. The device may also be equipped with a sectional electrode made as a wire placed on a receiver line, the surface of which is an equipotential surface, and the wire length should not exceed 10 m. The sectional electrode of the device may also be made as a multiloop flexible conductor placed on the receiver multi-electrode cable line, and the overall width of winded wire should not exceed 10 m, and each loop is in this case an individual element of the electrode. In this implementation option, the length of winded wire is unlimited, and its width measured by siding loops should not exceed 10 m. The sectional electrode may also be made as a group of several individual electrodes connected in parallel to each other, with each electrode being an element of a section, and the input/output to the receiver multi-channel electrode line is made in one point of the sectional electrode. The total width of the group or the length of all section of the receiving electrode shall not exceed 10 meters, as the condition of a 5 percent ratio of the dimensions of the sectional electrode and the distance (span) between the pairs of sectional electrodes must be observed.

Therefore, the positive technical results achieved by the claimed group of inventions compared to the known technical solutions is a higher quality of marine electrical exploration during vessel motion, in particular, more accurate predicting of hydrocarbon deposits because the proposed method and device design for the implementation of this method enable a reduction of noise arising on receiving electrodes and varying under the effect of turbulent flows during vessel motion, and thus obtaining more accurate measurement results.

DESCRIPTION OF THE DRAWINGS

The invention is illustrated with drawings showing the device for implementation of the method of marine electrical exploration during vessel motion and relative position of its parts as well as graphs that prove realizability of the claimed method.

FIG. 3: Examples of electrode connection in the group to the receiver line:

FIG. 3c: sectional electrode in the form of individual electrodes with one input/output to the receiver line;

FIG. 4a shows a signal when 20 sections are applied in the sectional electrode;

FIG. 4b shows a signal when 10 sections are applied in the sectional electrode;

FIG. 4c shows a signal when 2 sections are applied in the sectional electrode.

OPTIONS FOR IMPLEMENTATION OF THE GROUP OF INVENTIONS

Figure 1:
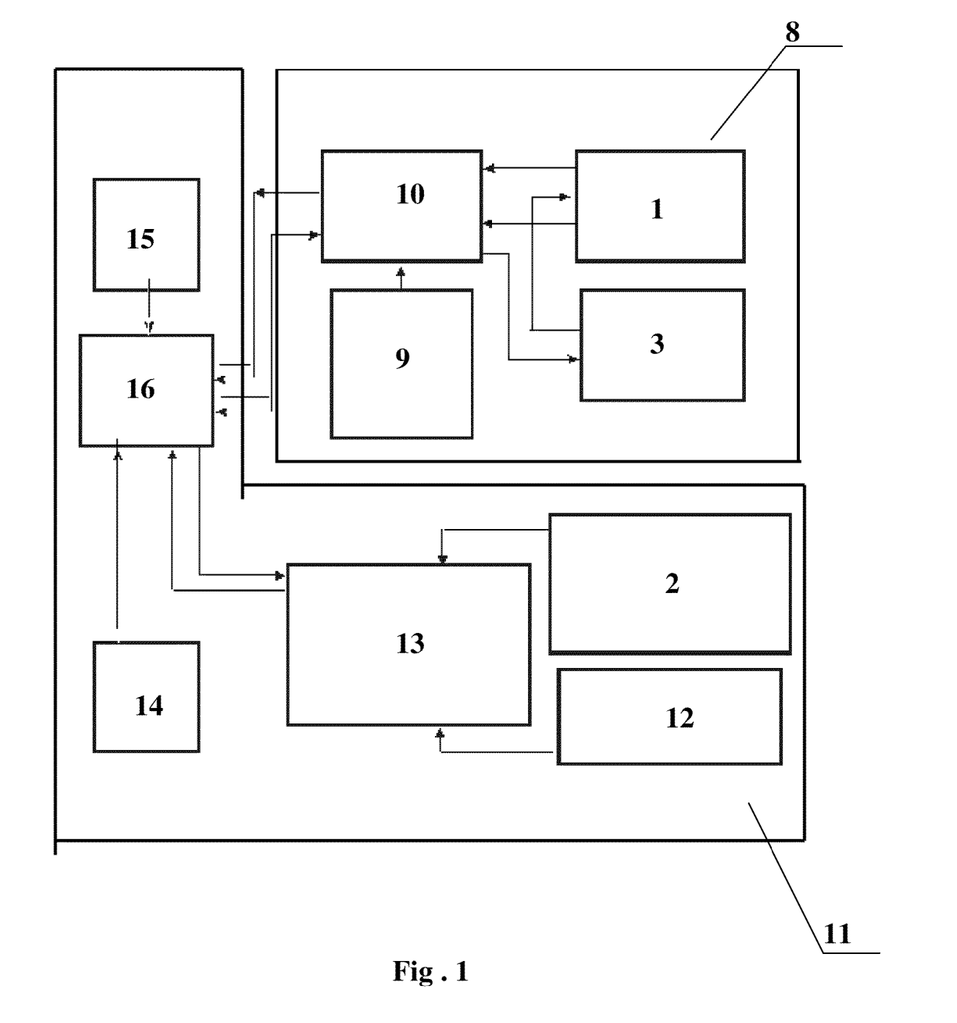
FIG. 1: General scheme of measurements.
Figure 2:
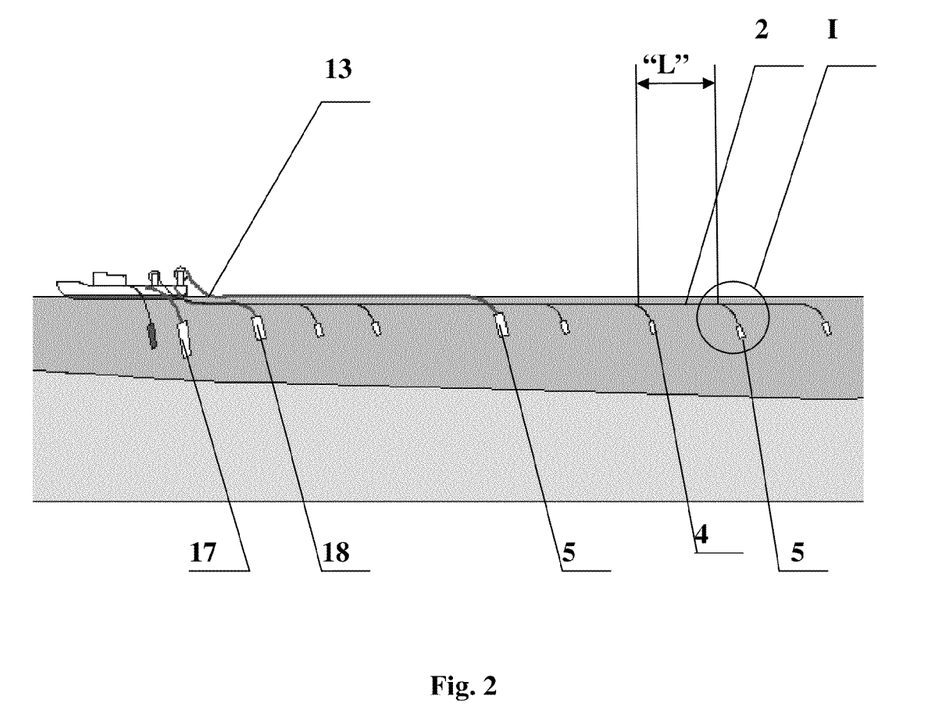
FIG. 2: Spatial arrangement of the cable lines in relation to the vessel.

The claimed method of marine electrical exploration during vessel motion is implemented as follows:

Profiling is done with a generator line (1), receiver line (2), and anode ballast device (3) overboard. In the generator line, bipolar alternating-sign rectangular direct current pulses are generated, the length and relative duration of which are set by program in the range of 0.5 to 10 s basing on the total conductivity of geological section and depth of exploration, alternating-sign current pulses, and measurement of signals in the receiver line (2) both during the current passage and in pause between pulses, the electric field is measured simultaneously on pairs of receiving sectional electrodes (4,5) of the receiver multi-channel line (2), with account taken of the spatial averaging of potential of the double electric layer arising on the electrode-water boundary during vessel motion both for direct current pulses and in pauses between the pulses, for a given point set in medium space (A) the parameters of simulative layered conducting and polarizable medium are selected so that the values of characteristics of the estimated field of this medium would be equal to the values of simultaneous measurements on all the pairs (spans) (6) of the receiving sectional electrodes (4, 5) of the receiver multi-channel line (2) obtained both during the direct current pulses and in pauses between them. The geoelectric parameters of the medium may be determined basing on the directly obtained differences of potentials of sectional electrodes (which are at the same time group electrodes clustered by several sections), in addition, the geological parameters of the medium may be determined with application of an adjustment factor introduced for accounting the 5% allowance in the group electrode width (or wire length for the implementation option as a wire attached to the receiver line) to L, the span value. The selection of parameters of the layered conducting and polarizable medium is repeated for each given point of the vessel location over the geological profile, the sections by the obtained parameters are made, and a conclusion on existence of a hydrocarbon deposit is made basing on the identified anomalies. At introduction of the adjustment factor, the identified anomalies represent the adjusted parameters of the induced polarization. The necessity in adjustment is caused by the use of sectional electrodes whose dimensions are close or greater than the value, an electrode with dimension of more than which cannot be classified as "pointlike", which brings spatial uncertainty into measurements. Anomalous areas on a graphical image of the section fragment by polarizability between survey pegs correspond to HC deposits (hydrocarbon deposits).

Figure 3A:
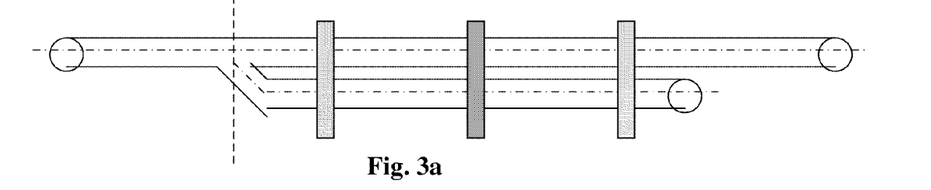
FIG. 3a: sectional electrode in the form of attached wire of a certain length.
Figure 3B:
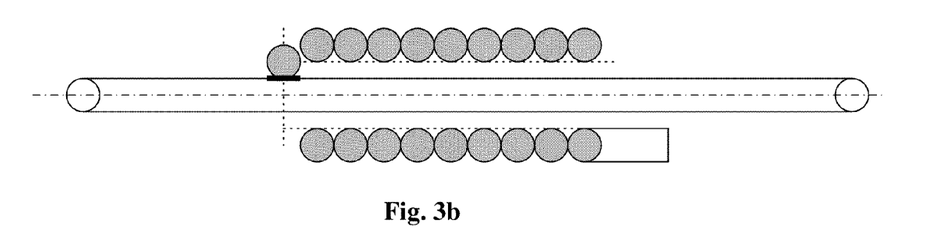
FIG. 3b: sectional electrode in the form of multiloop electrode attached to the receiver line.
Figure 3D:
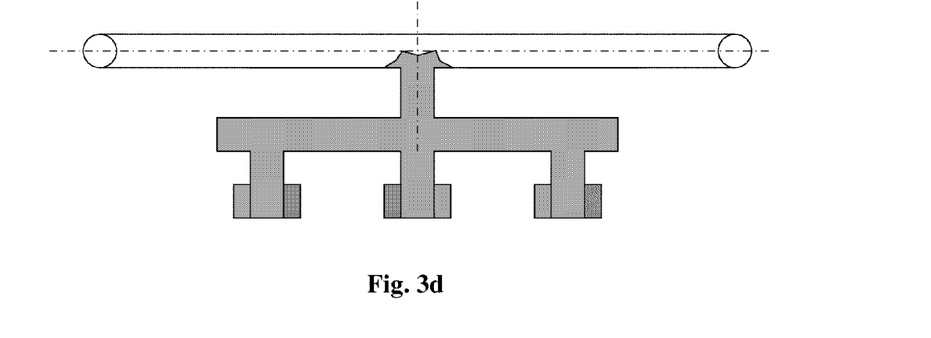
FIG. 3d: sectional electrode in the form of individual electrodes joined into a parallel connection and connected to the receiver line via a common equipotential surface.
Figure 4:
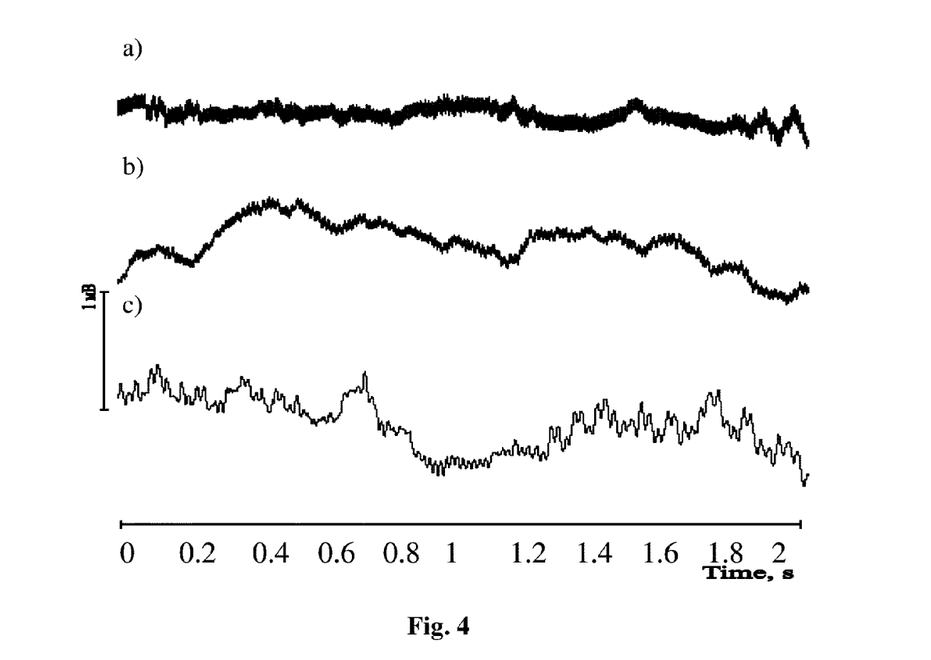
FIG. 4: Signal from the receiver line obtained with spatial averaging where the effect of noise from double electric layers is minimized, after processing by the smoothing algorithm in a sliding window in order to remove any high-frequency industrial noise. Where.

For this method of electrical exploration during vessel motion, a substantial feature that distinguishes it from any prior art methods is that measurements are done basing on spatial averaging of potential of the double electric layer arising on the electrode-water boundary during vessel motion, on pairs of receiving sectional electrodes of the receiver multi-channel line. For this, the sectional electrodes of the receiver multi-channel line (2) are applied (see FIG. 3a,b,c,d). Here, the sectional electrodes are a group of elements (7) that are electrically connected to each other. The group of elements here as a whole must represent a receiving electrode which dimensions shall not exceed 5% of L, the distance between spans, i.e. pairs of sectional electrodes (6), each of which is a group of elements (7). These conditions are substantial, as the elements of the group together may diminish the waves coming to the observation profile at various angles to the reflected waves falling vertically, i.e. the group of elements of a sectional receiving electrode has a certain selecting ability. Thus in the measurement option (FIG. 3a) on the sectional electrode that is a wire 10 m long or shorter (considering that the distance between receiving sectional electrodes, i.e. the span value is 100 m or more) the sections of the receiving electrode is each point of the electrode, which is a geometric locus of points of the equipotential surface. Therefore, EMF in each section of the electrode is integrated. In the measurement option on the sectional receiving electrode made in the form of electrodes that are connected in a circuit and electrically joined (FIG. 3c), integration is replaced with composition at each of the elements (7) of sectional electrodes that are part of the circuit. In the measurement option on the sectional receiving electrode made in the form of a multiloop flexible conductor (FIG. 3 2b) placed on the receiver line, EMF are added at each loop representing an element (7) of the sectional receiving electrode. In the measurement option on the sectional receiving electrode made in the form of several electrodes connected in parallel (FIG. 3d), EMF is added at each element (7) as an individual electrode in a group that forms a sectional electrode.

Therefore, by composition of EMF in the group the composition of oscillations caused additionally by falling water jets on the electrode-water boundary during vessel motion is achieved. Without such composition, the difference of potentials between pairs of receiving electrodes contains a measurement error as measuring is performed during vessel motion. In case of composition of EMF generated in the same measurement point A, but at different points of time, in the sectional electrode (due to the spatial span between elements of the receiving electrode) there occurs spatial averaging of potential of the double electric layer arising on the electrode-water boundary during vessel motion, on the pairs (6) of receiving sectional electrodes of the receiver multi-channel line, which in its turn provides a significant increase of measurement accuracy as the error from extra EMF is removed.

Figure 5:
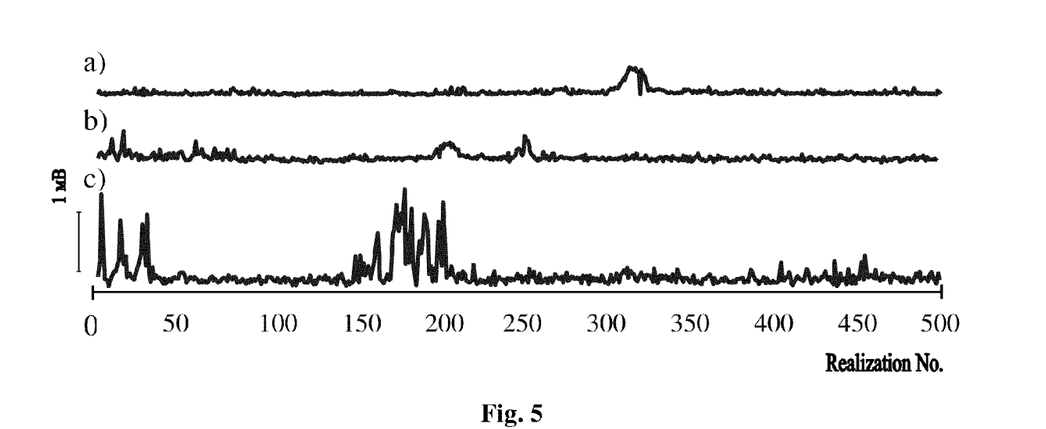
FIG. 5: Graphs of $S_N$ robust analog of standard deviation for three series of measurements with spatial averaging: for a) 20, b) 10, and c) 2-sectional electrode, respectively.

The reason for this effect is that extra natural oscillations leading to the error at measurement are low-frequency oscillations, and the measurement error declines as the number of sections of the receiving electrodes increases. As each section of the receiving electrode is a generator of normally distributed noise, in this case the measurement accuracy rises in inverse proportion to $\sqrt{N}$, where N is a total number of sections of sectional electrodes in the receiver line. It is ensured by normal nature of the distribution of s and std noise as shown on the graph (FIG. 5).

TABLE 1

| No. | N-total number of electrodes | 91% of data s mcV | std mcV | 100% of data s mcV | std mcV | 91% of data s√N | std√N | 100% of data s√N | std√N |
|---|---|---|---|---|---|---|---|---|---|
| 1 | 2 | 145.61 | 2.42 | 190.54 | 7.38 | 205.92 | 3.43 | 269.47 | 10.44 |
| 2 | 10 | 85.54 | 1.23 | 98.56 | 2.48 | 270.52 | 3.90 | 311.69 | 7.83 |
| 3 | 20 | 60.84 | 1.00 | 69.63 | 2.02 | 272.07 | 4.47 | 311.41 | 9.04 |

Figure 6:
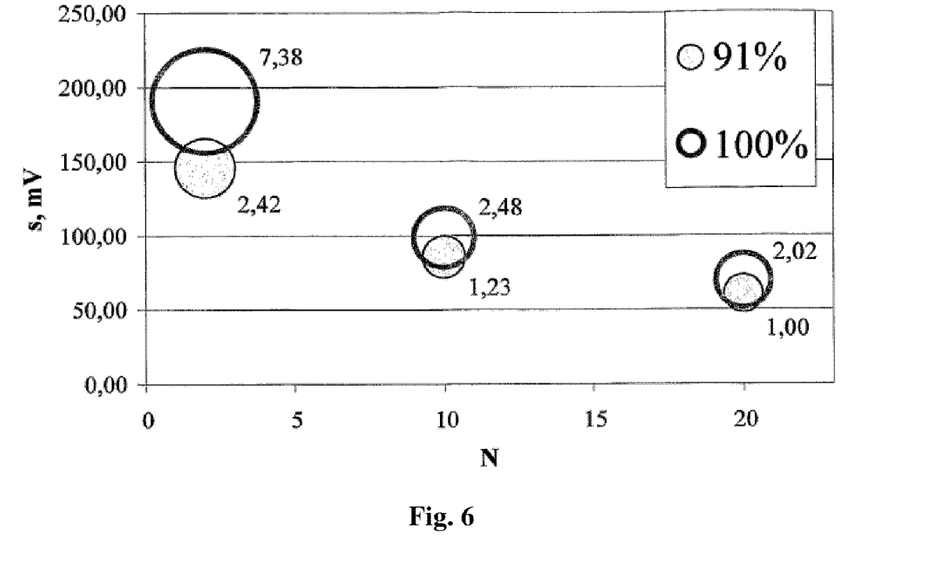
FIG. 6: Diagram of values of average s (ordinate of the circle center) and standard deviation std (circle radius) for each of the measurement series $(S_N)_i$, where N is a total number of sections of sectional electrodes in the receiver line.
Figure 7:
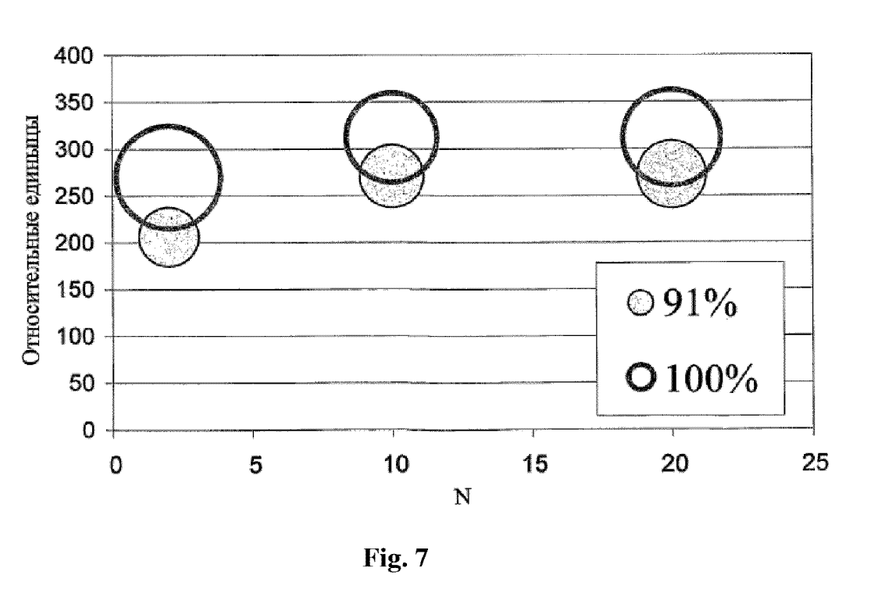
FIG. 7: Diagram of s values (ordinate of the circle center) and standard deviation std (circle radius) multiplied by $\sqrt{N}$ for each of the measurement series $(S_N)_i$, where N is a total number of sections of sectional electrodes in the receiver line.

In Table 1, "Table of the series of values of the robust analog of standard deviation: $(S_N)_I$ for every one in i two-second implementations in a series of measurements", along with FIG. 4a,b,c it is shown that with increase of the electrodes number the noise in the line reduces correspondingly and the measurement stability increases. Table 1 and FIG. 6 show that there is a dominating role of normally distributed noise in the measured data, which means that the values of measurements are not distorted due to the use of sectional electrode, i.e. in case of 100% sampling for 10 and 20 electrodes, said values are not just statistically indistinguishable but they turn to be equal up to the third significant figure. This measurement result is confirmed by the fact that in case the harmonic component at measurement has a dominating role, the measurement accuracy would only reduced in inverse proportion to the number of sections of receiving electrodes at one of the ends of the wire N/2 and not in inverse proportion to $\sqrt{N}$. Thus, the spatial averaging of potential of the double electric layer arising on the electrode-water boundary during vessel motion is achieved, i.e. the increase of the electrode area will cause averaging of this effect, which will stabilizes the difference of potentials between receiving electrodes. The averaging, in turn, provides a technical result: an increase of measurement accuracy in exploration during vessel motion by reducing of the noise arising in flowing medium on the electrode-water boundary at motion.

The reliability of the measurement results obtained is proven by the fact that a conclusion on existence of a hydrocarbon deposit basing on the identified conductivity anomalies and induced polarization parameters is made without any effect of high-frequency noise caused by external medium, such as cultural noise or noise from atmospheric phenomena. It is confirmed by the fact that medium parameters are calculated using the algorithm of smoothing in a sliding window the length of which is chosen to be divisible by two noise periods at 50 Hz frequency, and the value in the window is taken equal to M-evaluation found using the Hampel's function. M-evaluation is stable regarding radically outstanding observations, which is also called robustness. In order to find it, a weight ψ function is applied to the initial data sequence, $x_i$ (i=1, ..., N), which makes it possible to reduce the effect of radically outstanding observations in the distribution tail area. M-evaluation (m) is a solution of the following nonlinear equation:

$$\sum \psi\left(\frac{x_i - m}{\sigma}\right) = 0,$$

where σ plays a scaling role and is found through MAD (median absolute deviation):

$$\sigma = 1.483 MAD = 1.483 \text{median}|x_i - \text{median}(x_i)|.$$

To assess a confidence interval of M-evaluation the standard deviation, $S_N$, is applied:

$$S_N = \sigma\left[\frac{1}{N-1}\sum \psi\left(\frac{x_i - m}{\sigma}\right)^2\right]^{1/2}.$$

As oddity is an important property of ψ function, i.e. ψ(−x)=−ψ(x), when ψ(x)=x, m becomes the average, and $S_N$ becomes the mean-square deviation, then the Hampel's function is used frequently in practice as ψ function:

$$\psi(x) = x \qquad 0 \le |x| < C_1$$
$$= C_1 \qquad C_1 \le |x| < C_2$$
$$= C_1(C_3 - x)/(C_3 - C_2) \qquad C_2 \le |x| < C_3$$
$$= 0 \qquad C_3 \le |x|.$$

The constants are assigned the following values: $C_1=1.2$, $C_2=3.5$, $C_3=8.0$. After the high-frequency noise is suppressed by applying the Hampel's function in a sliding window, $(S_N)_i$, the robust analog of standard deviation is found for every one i two-second implementation (FIG. 5).

TABLE 2

| No. of measurement series | Statistics | No. of record channel and difference of potentials | | | |
|---|---|---|---|---|---|
| | | 1 DU, mcV | 2 D2U, mcV | 3 DU, mcV | 4 D2U, mcV |
| 1 | Average | 194 | 104 | 166 | 65 |
| | Standard dev. | 96 | 53 | 92 | 35 |
| 2 | Average | 349 | 150 | 353 | 79 |
| | Standard dev. | 239 | 87 | 297 | 48 |

Where:

DU is the first order spatial difference of potentials;

D2U is the second order spatial difference of potentials;

Table 2, "Results of comparison of average values and standard deviations of the standard deviation array describing the stability of measurements", shows that the distribution of the s and std noise is normal.

Therefore, the reliability of suppression of the noise caused by presence of potential of double electric layer arising during vessel motion and, consequently, higher measurement accuracy are achieved.

For implementation of the claimed measurement method, a device for marine electrical exploration during vessel motion is proposed, which consists of an exciting field generation unit (8), which includes a ship generator (9), a switchboard (10) generating bipolar rectangular direct current pulses, a generator plant (9), a ballast device (3), a signal measurement unit (11) comprising a receiver multi-channel line (2), a resistivity meter (12), a multi-channel measurement device (13), a ship echo sounder (14), a Global Position System receipt indicator (GPS) (15), and a signal processor (16). In the exciting field generation unit (8), the switchboard (10) provides generation of bipolar rectangular direct current pulses on feeding electrodes (17, 18) with 0.5 to 10 s duration and 5 to 1000 A current strength, and with a relative duration of pulse sequence set by program. The generator plant, i.e. the exciting field generation unit (8) consists of two cable lines, where the first line is 100 m long or shorter and has at least one emitting electrode (17) on the end or near the end, and the second line is 500 to 1000 m long and has at least one emitting electrode (18) on the end or near the end, both lines are, e.g., parallel, and they are placed behind the vessel stern and made of cable with over 5% positive buoyancy, e.g., 15%, the emitting electrodes (17,18) are made of conductive material allowing their slow destruction at current passage, the non-emitting ballast device (3) is placed behind the vessel stern and represents pairs of alternating electrical dipoles with equal moments, and the receiver multi-electrode cable line (2) in the signal measurement unit (11) is placed behind the stern of vessel, e.g., in parallel to the cable lines (electrodes 17, 18) of the generator plant, the exciting field generation unit (8), tugged on a given depth from the water surface, with length of more than 1,000, e.g., about 2,000 m, made of stranded cable with a buoyancy close to neutral, connected to the multi-channel measurement device (13) and equipped with receiving sectional electrodes placed on the receiver multi-electrode cable line (2) with 100 to 200 m interval, which are spatially located both between the emitting electrodes of the generator plant and behind them.

This device may be assembled as follows,

The switchboard (10) is placed into an individual room of the ship and connected to the direct current ship generator (9) directly or to the alternating current ship generator three-phase rectifier. The switchboard generates bipolar pulses in the generator line (1) and switches the ship generator to the ballast device (5) for dispersing of the generator's capacity in pauses between the pulses.

The design of the ballast device as described above does not generate an outside electric field as it is pairs of alternating electrical dipoles with equal moments.

Both branches with the radiating electrodes (17, 18) of the generator line (1) are made of floating cable in order to provide minimum hydrodynamic resistance at tugging.

In an individual room the multi-channel measurement device (13), to which the multi-span receiver line (2) tugged behind the vessel, resistivity meter (12), and signal processor (16) are connected, is placed. The signal processor also receives information on the sea depth from the ship echo sounder (14) and the scheduled position of the vessel from the satellite navigation system, GPS (15). In individual cases, an adjustment that takes account of "the non-pointness" of the sectional receiving electrode related to its real dimensions is also received by the signal processor.

The multi-channel measurement device (13) measures the field intensity in set pairs of receiving sectional electrodes (4, 5) and resistivity meter (12) at the same time. The number of receiving non-polarizable sectional electrodes is selected depending on the receiver line length, they are placed at a regular interval from 100 to 200 m.

The resistivity meter is tugged in the water section, what enables its conductivity measurement.

The signal processor is used for pre-processing of all measured signals including the echo sounder and GPS data and data from the sectional receiving electrodes in a given point at each moment of time. The signal processor also records all the measured signals on a hard carrier which enables a real-time visualization in order to control incoming information. The cable lines of the generator plant may be made of a conducting material and isolated from water, and the emitting electrodes of the generator plant may be made, e.g., of graphite-reinforced plastics. The ballast devices may consist of two cylindrical graphite-reinforced plastic electrodes connected to the positive pole of the switchboard and separated by an insulating dielectric insert, and at least two cathodes placed inside the insulating insert symmetrically to the electrode axis at equal distance from the end, respectively. The ship generator may be made as a direct current generator or an alternating current generator with a rectifier. Inside the second cable line of the generator plant, there may be wires of the receiver multi-electrode cable line, and the receiver multi-electrode cable may be connected to the end of the second cable line of the generator plant.

The sectional receiving electrodes here may have several design options. A sectional electrode may be in the form of individual electrodes that are electrically connected to each other in sequence and represent sections (7), and EMF readings are taken at any point of the equipotential surface, which is on the wire (19) connecting the sectional (group) electrode to the receiver line (2) (see FIG. 3c) through the input/output. In this case, the length l is combined of the lengths of individual sections of the receiving electrode and the wire between them. The second implementation of the sectional electrode is a direct wire which is electrically connected to the receiver line (2) through the input/output and is attached to it with, e.g., clamps at all its lengths, which cannot exceed 10 m, or hangs freely in water (see FIG. 3a). Here, the entire wire surface is equipotential. The third implementation option of the sectional electrode can be a wire of any length, which is wound on the receiver line cable provided that H, the overall width of all loops of the cable, does not exceed 10 m. Here, the wire is electrically connected with the receiver line from one side only through the input/output. The surface of all the loops, a, is equipotential, and each individual loop is an individual section (7) of the sectional electrode. The fourth implementation option of the sectional electrode is individual electrodes (7) grouped so as they are all connected electrically in parallel, and the equipotential surface is the wire (19) electrically connected to the receiver line through the input/output point.

USE OF INVENTION

The device for implementation of the claimed method of marine electrical exploration during vessel motion works as follows.

As the ship comes into the profile beginning point, which is determined by the GPS system (15), the processor (16) is started that runs the operations of the switchboard (10) and the signal measurement unit (11).

The processor commands to start generating a current pulse, e.g., with a positive polarity. After that, data from the resistivity meter (12), GPS receiver, and echo sounder (14) are registered.

The pulse length may be 0.5 to 10 seconds depending on medium parameters and problems solved. At a given time moment before the pulse ends (e.g., ⅛ of the pulse length), the processor (16), that runs the switchboard (10), generates a clock pulse that comes into the multi-channel measurement device (13), which begins to register with a given discreteness the values of steady-state field at all spans (pairs of the sectional electrodes 4,5) of the receiver line (2) and current in the generator plant (8) and generator line (1). The clock pulse ends at the same time as the current pulse in the generator line (1), which the reception equipment uses as a signal to begin registration of the field decline. After the current pulse has ended, the processor (16) sends a command to the switchboard (10) to switch the ship generator (9) to the ballast device (3), which is necessary for reducing of the load swings at the ship generator.

The multi-channel measurement device (13) begins to register with a given discreteness the counts of the differences of potentials of the steadying field on pairs of sectional electrodes (4, 5) at the receiver line (2) in each given point of space, A, at a given time moment.

At the end of pause, the length of which is determined by the work program of the processor (16), a current pulse with negative polarity is established in accordance with the algorithm described above.

Generation of bipolar pulses with pauses between them takes place along the entire length of the profile.

The presence of sectional electrodes in this design enables usage of this method of electrical exploration during vessel motion, as due to the spatial averaging, grouped electrodes suppress the noise arising out of vibration of the receiver line and attached to it electrodes as the line moves behind the vessel. Grouping of seismic detectors in seismic exploration makes it possible to add oscillations by joining the seismic detector outputs so that EMF in them are combined. Such a group of seismic detectors can weaken waves coming to the observation profile at various angles to the reflected waves falling vertically, i.e. it has a certain directional selection (V. V. Znamensky, Field Geophysics. M., Nedra, 1980. 351 p. Pages 279-284).

As the main part of noise on the receiving electrodes appears due to changing in flowing medium potential from the double electric layer arising on the electrode-water boundary, the increasing of the electrode area causes averaging of this effect, which stabilizes the difference of potentials between the receiving electrodes. Movement of the receiver line in the magnetic field of the earth causes EMF to appear in it, and as this movement is irregular, the EMF changes and must cause a change of the difference of potentials on the receiving electrodes. However, the receiver line is designed so that wires in the cable have equal length, and so the arising EMF in this case is the same and removes as difference of potentials is generated from two electrodes connected to two wires of the same length, which are located in the same cable. All the line jerks will ultimately lead to changing of potential in the double electric layer on the electrode-water boundary.

The overall width of the sectional electrode (group) here may not exceed 10 meters. This size is required for accurate measurements obtaining: as the ratio of the sectional electrode width (10 meters) to distance between the sectional electrodes (2,000 meters) $\leq 5\%$, it may be regarded as "a pointlike electrode".

So the sectional electrodes made as a piece of wire wound in a spiral may be regarded as "a pointlike electrode" in relation to the span, and each loop of the winding may be regarded as an independent element of a sectional electrode. In this case, it is not a length of wound material but the overall width of all the loops that is important. The thinner the wire, the more loops on a 10 m distance can be wound, and, consequently, the number of elements in the section, which leads to the best EMF averaging, may be, and, consequently, more accurate measurement may be done.

If a sectional electrode is made as a wire, the length of the wire itself is more important for measurement, and its thickness does not matter much. E.g., it can be a wire or a lead metal tube put on top of the receiver line. Here, in a sectional electrode made as a simple piece of wire, the sections size approach to point, i.e. simple adding turns into integration by the equipotential surface of this wire. Increasing of the number of elements in the section causes averaging of the effect of noise arising due to the changing in flowing medium potential from double electric layer arising on the electrode-water boundary, and stabilization of the difference of potentials registered between the receiving sectional electrodes, which in its turn increases the measurement accuracy.

It should here be remarked that increasing of the dimensions of a sectional electrode and reducing of its sections increase measurement error. At the same time, as the thickness of sections of a sectional receiving electrode increases, and as much thicker elements of the sections move, then a greater force of resistance of these elements to water arises which also affects measurement accuracy. The best measurement accuracy is achieved when the overall size of all sections of the receiving electrode is much greater than the thickness of each element. This principle has been confirmed by experimental studies in the Irkutsk water reservoir and the Barents Sea.

Another option for implementation of the sectional electrode may be a design consisting of several individual electrodes connected in parallel or in sequence, and each electrode is an element of a sectional electrode.

Here, the sectional electrodes may be made of metal wire with a low value of the polarizability coefficient.

Therefore, the following technical result is achieved: obtaining of more accurate data of measurement of the difference of potentials and a detailed construction of the geological section along the observation profile, for more reliable determination on existence of a hydrocarbon deposit. The known methods and devices could not provide the proposed accuracy during vessel movement. A higher accuracy is achieved by eliminating or reducing of the effect of noise arising due to changing in flowing medium potential from the double electric layer arising on the electrode-water boundary.

An experimental voyage took place at the Irkutsk water reservoir, during which three series of measurements were made: with twenty, ten, and one receiving electrode. Lead sheets shaped as tubes around a wire (tube length: 20 cm) were used as electrodes, to each of which a foam floater was attached with strings. With a 24-digit AD converter, $\Delta U$ between two groups of electrodes were recorded on the hard disk of a laptop. The measurements were made in the same mode as in field measurements: two seconds of recording followed by a two-second pause. For a statistically significant result, over 500 implementations were recorded for each of three series.

The calculation results are shown in tables 1 and 2, which shows that with the increase of number of sections (elements) of the sectional receiving electrodes the noise in the line reduces regularly and the stability of measurements increases.

The experiment has shown with confidence that grouping of the electrodes gives a positive effect that increases in proportion to the square root of the total number of electrodes.

Similar test work was done on the Barents Sea in order to find the efficiency of using of long receiving electrodes in sea water, which has low electrical resistance.

Behind the equipped vessel, a specially made receiver line was transported in a submerged position with the speed of 7 km/h. The wind speed was 5 m/s, and the heaving was 0.5 points.

Measurements were done simultaneously, to the measurement channels 1 and 2 the 0.5 m long lead wire electrodes were connected, and to 3 and 4—the 10 m long. Channels 1 and 2 measured the first order spatial difference of potentials (DU), and 2 and 4—the second order spatial difference of potentials (D2U). Two measurement series were performed, namely, 150 and 740 time implementations of 4 seconds with a pause after 4 seconds. For each time implementation of the measured signal, the accuracy values were calculated.

The provided data prove that increasing of the electrode length for DU leads to an insignificant noise reduction, whereas for D2U the noise reduces by 1.5-2 times. Such noise suppression for D2U is significant, as the transient process on the second spatial difference of potentials has a many time lower amplitude than on the first difference. However, it should be taken into account that when the sectional receiving electrode length is increased more than 5% of the span, there appears spatial uncertainty at measurement and construction of a graphic image of the section by polarizability. For this reason, when the dimensions of sectional electrode are close to or greater than 5% of the span between pairs of sectional electrodes, this uncertainty may be taken into account by introducing an adjustment factor.

The receiver lines made with use of sectional electrodes have enabled high-quality measurements at the marine method of electrical exploration in the Barents, Azov, and Caspian seas and freshwater basins of the Ob and Taz Bays.

The invention claimed is:

1. A method of marine electrical exploration during vessel motion, consisting in the following: the geological medium in the motion of vessel is examined along the observation line by exciting of periodical alternating current pulses in the medium, for which purpose bipolar rectangular direct current pulses are generated, the length and relative pulse duration of which are set by program basing on the total conductivity of the geological section and the expected depth of the deposit, the electric field is measured simultaneously on pairs of receiving electrodes of a multi-channel receiver line both for the direct current pulses and in pauses between them, for a given point of the medium the parameters of a layered conducting and polarizable medium of the given point of the observation profile are so selected that the value of characteristics of estimated field of the medium would be equal to the simultaneous measurements on all the pairs of the multi-channel receiver line obtained both for the direct current pulses and in pauses between them, then selection of parameters of the layered conducting and polarizable medium of the geological section is repeated for each given point of the observation profile, geoelectrical sections are constructed, and conclusions are made on the existence of a hydrocarbon deposit basing on the identified anomalies of conductivity and induced polarization parameters, and wherein the electric field is measured based on the spatial averaging of potential of the double electric layer arising on the electrode-water boundary during vessel motion, on pairs of receiving sectional electrodes of the receiver multi-channel line.

2. The method according to claim 1, wherein geoelectric parameters of the medium are determined with account taken of an adjustment factor, and a conclusion on the existence of a hydrocarbon deposit is made basing on the identified anomalies reflecting adjusted parameters of induced polarization.

3. A device for marine electrical exploration during vessel motion, which consists of an exciting field generation unit, which includes a switchboard generating two bipolar rectangular direct current pulses on feeding electrodes with 0.5 to 10 s duration and 5 to 1000 A current strength, with a relative duration of the pulse sequence set by program, a ship generator, unit consisting of two cable lines, where the first line is 100 m long or shorter and has at least one emitting electrode on the end or near the end, and the second line is 500 to 1000 m long and has at least one emitting electrode on the end or near the end, both lines are parallel, placed behind the vessel stern, and made of cable with 5-15% positive buoyancy, the emitting electrodes are made of conductive material allowing their slow destruction at passage of current, a non-emitting ballast device placed behind the vessel stern and being pairs of differently directed electrical dipoles with equal moments, a signal measurement unit comprising a receiver multi-electrode cable line placed behind the vessel stern on a given depth from the water surface, with length of 1,000 to about 2,000 m, made of stranded cable with a buoyancy close to neutral, connected to a multi-channel measurement device and equipped with receiving electrodes placed on a receiver multi-electrode cable line with a 100 to about 200 m interval, which are spatially located both between the emitting electrodes of the generator plant and behind them, a resistivity meter, a multi-channel measurement device, a ship echo sounder, a Global Position System reception indicator, a signal processor, wherein each of the receiving electrodes is a sectional electrode, the total length of all sections of which does not exceed 5% of the distance between the electrodes (span), the elements of a sectional electrode are electrically connected to each other so that the EMF in them are added, and they are connected to the receiver multi-electrode cable line through a common input/output.

4. A device according to claim 3, wherein the sectional electrodes are made of metal wire with a low value of the polarizability coefficient.

5. A device according to claim 3, wherein the sectional electrode is made as wire sections placed on the receiver line, the total surface of which is an equipotential surface, and the wire length does not exceed 10 m.

6. A device according to claim 3, wherein the sectional electrode is made as a multiloop flexible conductor placed on a receiver multi-electrode cable line, where the overall width of winded wire should not exceed 10 m, and each loop represents an individual element of the electrode.

7. A device according to claim 3, wherein the sectional electrode is made as several electrodes connected in parallel to each other, with each electrode being an element of a section, and the sections are electrically connected to each other, and the input/output to the receiver multi-electrode cable line is in one point of the sectional electrode.

* * * * *